US011829400B2

(12) United States Patent
Yun et al.

(10) Patent No.: US 11,829,400 B2
(45) Date of Patent: Nov. 28, 2023

(54) TEXT STANDARDIZATION AND REDUNDANCY REMOVAL

(71) Applicant: INTERNATIONAL BUSINESS MACHINES CORPORATION, Armonk, NY (US)

(72) Inventors: Zhen Ou Yun, Xian (CN); Qing Li, Beijing (CN); Li Cao, Beijing (CN); Leilei Hu, Xi'an (CN); Xiao Kou, Xi'an (CN); Xiaoping Liu, Xian (CN); Tian Jiao Pu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 17/302,503

(22) Filed: May 5, 2021

(65) Prior Publication Data
US 2022/0358154 A1    Nov. 10, 2022

(51) Int. Cl.
*G06F 16/35*    (2019.01)
*G06F 16/33*    (2019.01)
*G06F 16/215*    (2019.01)
*G06F 16/31*    (2019.01)
*G06N 5/04*    (2023.01)

(52) U.S. Cl.
CPC .......... *G06F 16/353* (2019.01); *G06F 16/215* (2019.01); *G06F 16/31* (2019.01); *G06F 16/334* (2019.01); *G06N 5/04* (2013.01)

(58) Field of Classification Search
CPC ...... G06F 40/205; G06F 16/93; G06F 40/284; G06F 16/3347; G06F 16/906; G06F 16/285; G06F 40/117
See application file for complete search history.

(56) References Cited

U.S. PATENT DOCUMENTS

| 7,017,113 | B2 | 3/2006 | Bourbakis |
| 11,157,475 | B1 * | 10/2021 | Cobb ..................... G06N 20/00 |
| | | | 707/373 |
| 2002/0162090 | A1 | 10/2002 | Parnell |

(Continued)

FOREIGN PATENT DOCUMENTS

| CN | 106776548 B | 5/2017 |
| CN | 109033064 A | 12/2018 |

OTHER PUBLICATIONS

Isaraj, "The Value Of Social Context In The Use Of Imperative Sentences In English And Albanian Language," International Journal of Recent Scientific Research, vol. 6, Issue 9, Sep. 2015, 7 pages.

(Continued)

*Primary Examiner* — Yuk Ting Choi
(74) *Attorney, Agent, or Firm* — Elliot J. Shine

(57) ABSTRACT

The present disclosure provides a computer-implemented method, computer system and computer program product for text processing. The present in invention may include obtaining an original text input from a collaborative development environment. The present invention may include extracting a first text statement from the original input text. The present invention may include calculating a similarity value between the first text statement and a second text statement, wherein the second text statement is obtained from a statement database. The present invention may include comparing the similarity value to a pre-set threshold.

20 Claims, 6 Drawing Sheets

(56) References Cited

U.S. PATENT DOCUMENTS

| | | | |
|---|---|---|---|
| 2011/0231411 A1* | 9/2011 | Shein | G06F 16/355 |
| | | | 707/E17.061 |
| 2014/0136184 A1 | 5/2014 | Hatsek | |
| 2014/0297681 A1* | 10/2014 | Choi | G06F 16/9535 |
| | | | 707/769 |
| 2017/0053025 A1* | 2/2017 | De Sousa Webber | G06F 16/33 |
| | | | 707/373 |
| 2018/0113676 A1* | 4/2018 | De Sousa Webber | |
| | | | G06F 40/205 |
| | | | 707/373 |
| 2020/0210647 A1* | 7/2020 | Panuganty | G06N 20/10 |
| | | | 707/737 |
| 2020/0372215 A1* | 11/2020 | Uchida | G06F 40/35 |
| | | | 707/373 |
| 2021/0065053 A1* | 3/2021 | Higgins | G06F 9/542 |
| | | | 707/769 |

OTHER PUBLICATIONS

Leffa, "Clause Processing in Complex Sentences," Jan. 1998, 9 pages, <https://www.researchgate.net/publication/228540741_Clause_processing_in_complex_sentences>.

Mell, et al., "The NIST Definition of Cloud Computing", National Institute of Standards and Technology, Special Publication 800-145, Sep. 2011, 7 pages.

Sujaini, et al., "A Novel Part-of-Speech Set Developing Method for Statistical Machine Translation," Telkomnika, vol. 12, No. 3, Sep. 2014, pp. 581-588.

Suleiman, et al., "Using Part of Speech Tagging for Improving Word2vec Model," IEEE Xplore, accessed May 3, 2021, 7 pages.

* cited by examiner

TEXT STANDARDIZATION AND REDUNDANCY REMOVAL

BACKGROUND

The present invention relates to text processing technologies, and more specifically, to methods, systems, and computer program products for text processing applied in text standardization and redundancy removal.

Collaborative development environments continue to increase in importance given today's work environment. A collaborative development environment is a virtual workspace where users work together on projects, such as, but not limited to, software development, open source projects, academic research, business collaboration, amongst others. The virtual workspace enables geographically dispersed users to collaborate using centralized resources and tools. The virtual workspace may receive contributions such as documents, files, and code from users. The contributions of a large number of files and/or entries from users may be received in multiple different modules and systems. These files and/or entries may be comprised of at least redundancies, nonuniform phraseology, tautology, non-standard expressions, non-standard statements, and errors.

The absence of standard text and uniform standards may frustrate meaningful collaboration between users and hinder project progress.

SUMMARY

Embodiments of the present invention disclose a method, computer system and a computer program product for text processing. The present in invention may include obtaining an original text input from a collaborative development environment. The present invention may include extracting a first text statement from the original input text. The present invention may include calculating a similarity value between the first text statement and a second text statement, wherein the second text statement is obtained from a statement database. The present invention may include comparing the similarity value to a pre-set threshold.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
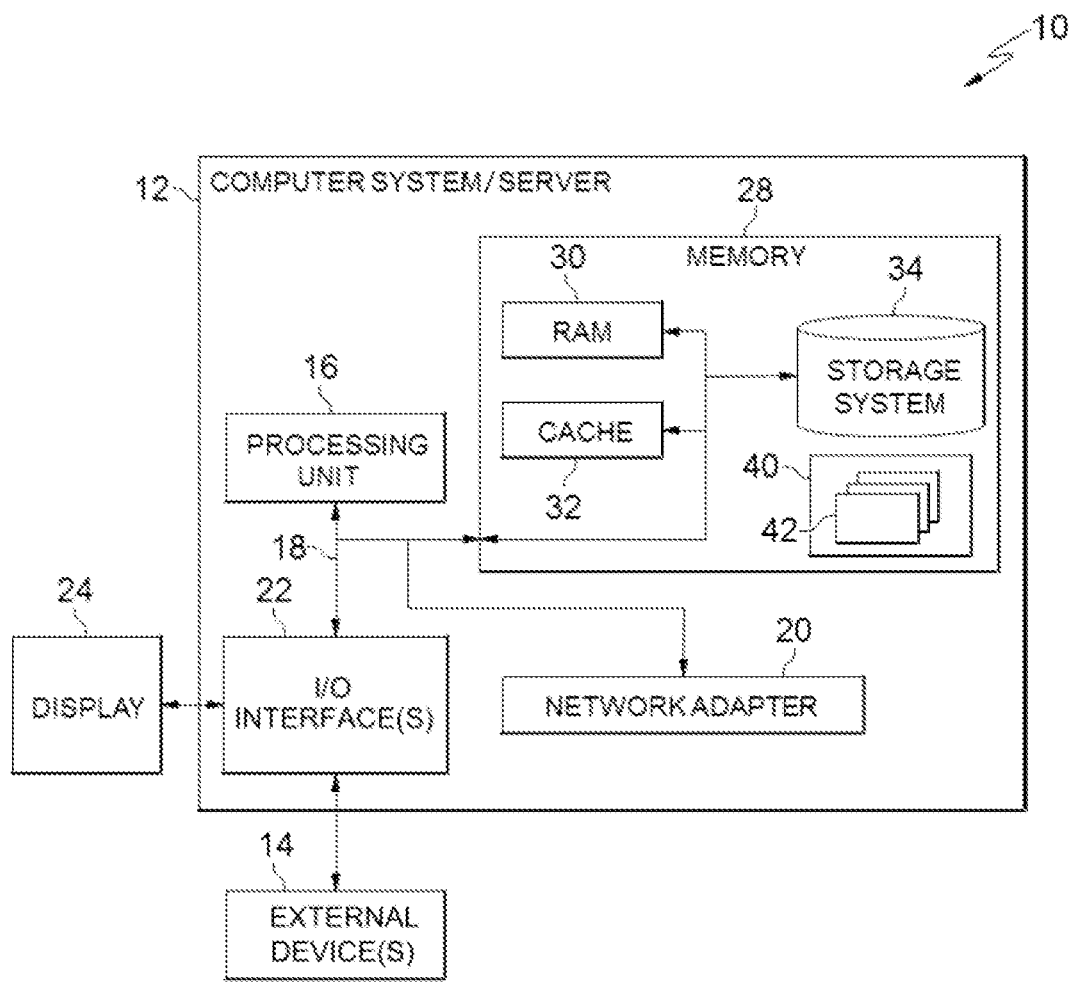
FIG. 1 depicts a cloud computing node according to an embodiment of the present invention.

Some embodiments will be described in more detail with reference to the accompanying drawings, in which the embodiments of the present disclosure have been illustrated. However, the present disclosure may be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
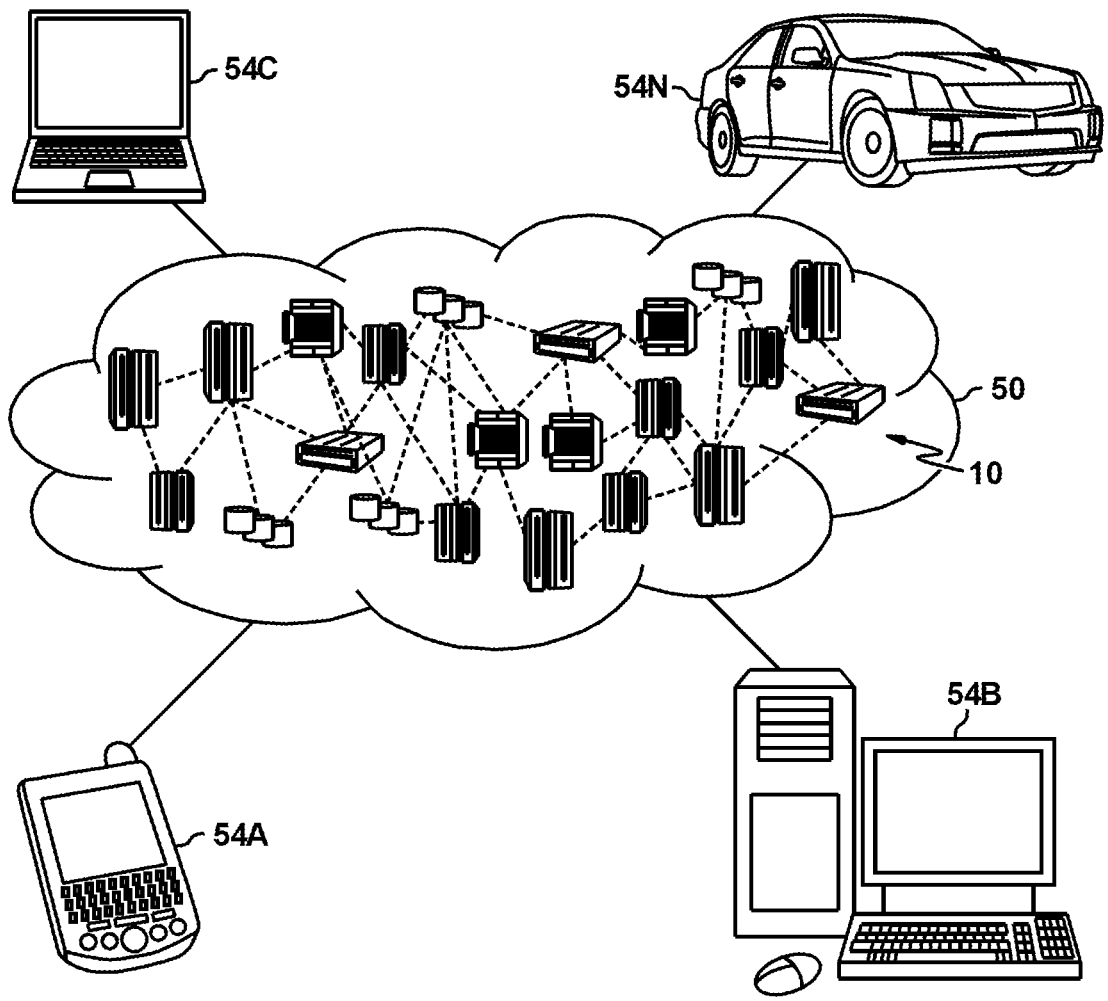
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 may communicate with any type of computerized device over any type of network and/or network addressable connection (e.g., using a web browser).

Figure 3:
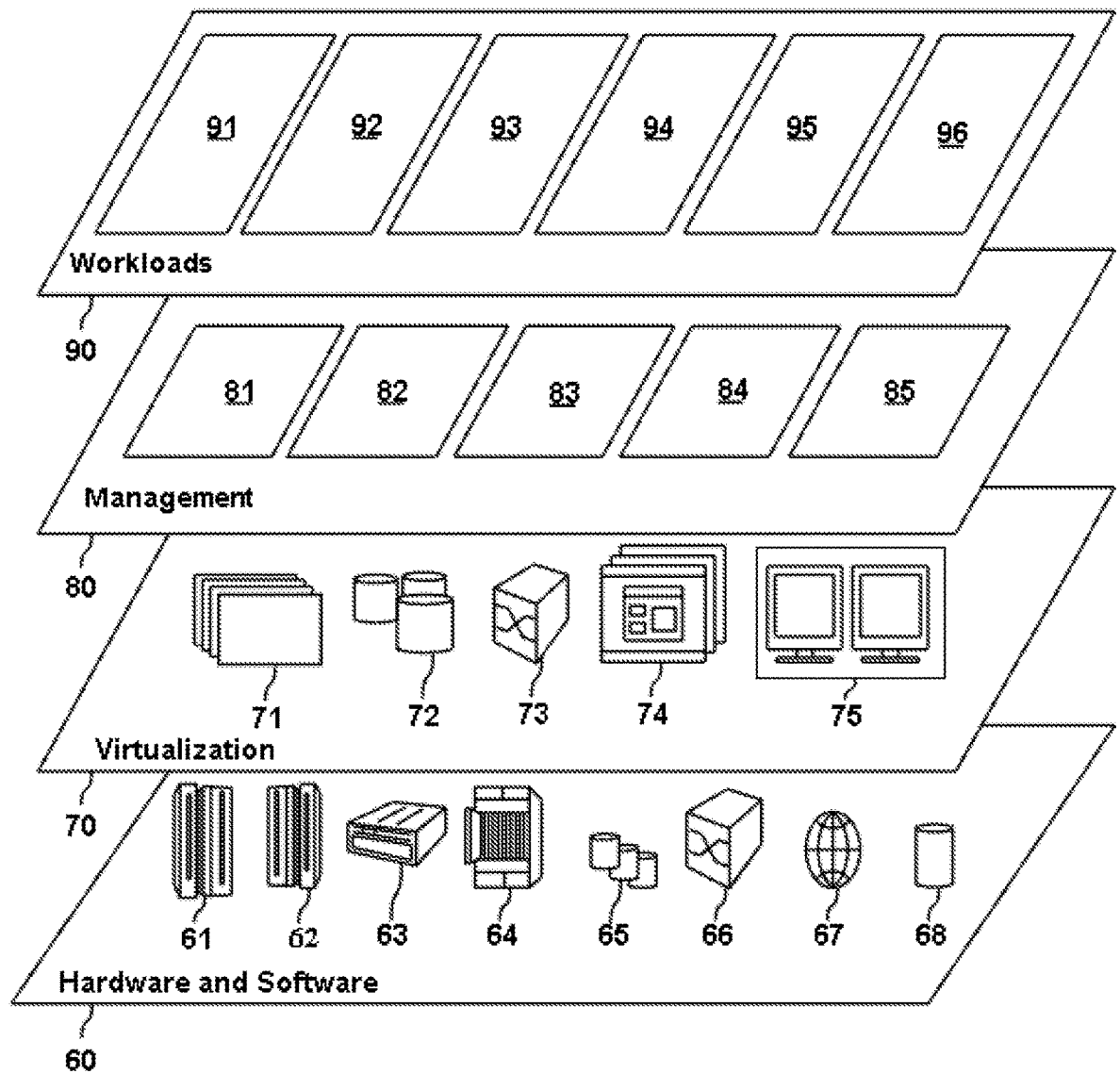
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text processing 96.

Collaborative developments are commonly applied in many industries. Taking collaborative software development as an example, multiple software developers may work collaboratively and contribute in the software development. As different developers may input different text statements or expressions, redundant and/or non-standard statements may be comprised in text files of the software to be developed.

As an example, for a text notification presented to users of the software, redundant text statements may include "Click this button to save your name and password." and "Click this button to save username and password.", etc. As an example, if a statement "Please enter a valid user id and password." is defined as a standard statement by developers, a non-standard statement may be "Please enter a good user id and password.", etc.

Developers or users may manually analyze the texts to find redundant and/or non-standard text statements and replace the redundant and/or non-standard text statements with a standard statement shared among the developers. However, this may be time consuming and costly.

The present invention provides computer-implemented methods, systems, and computer program products for text processing, which may be applied to find and process redundant and/or non-standard text statements.

Figure 4:
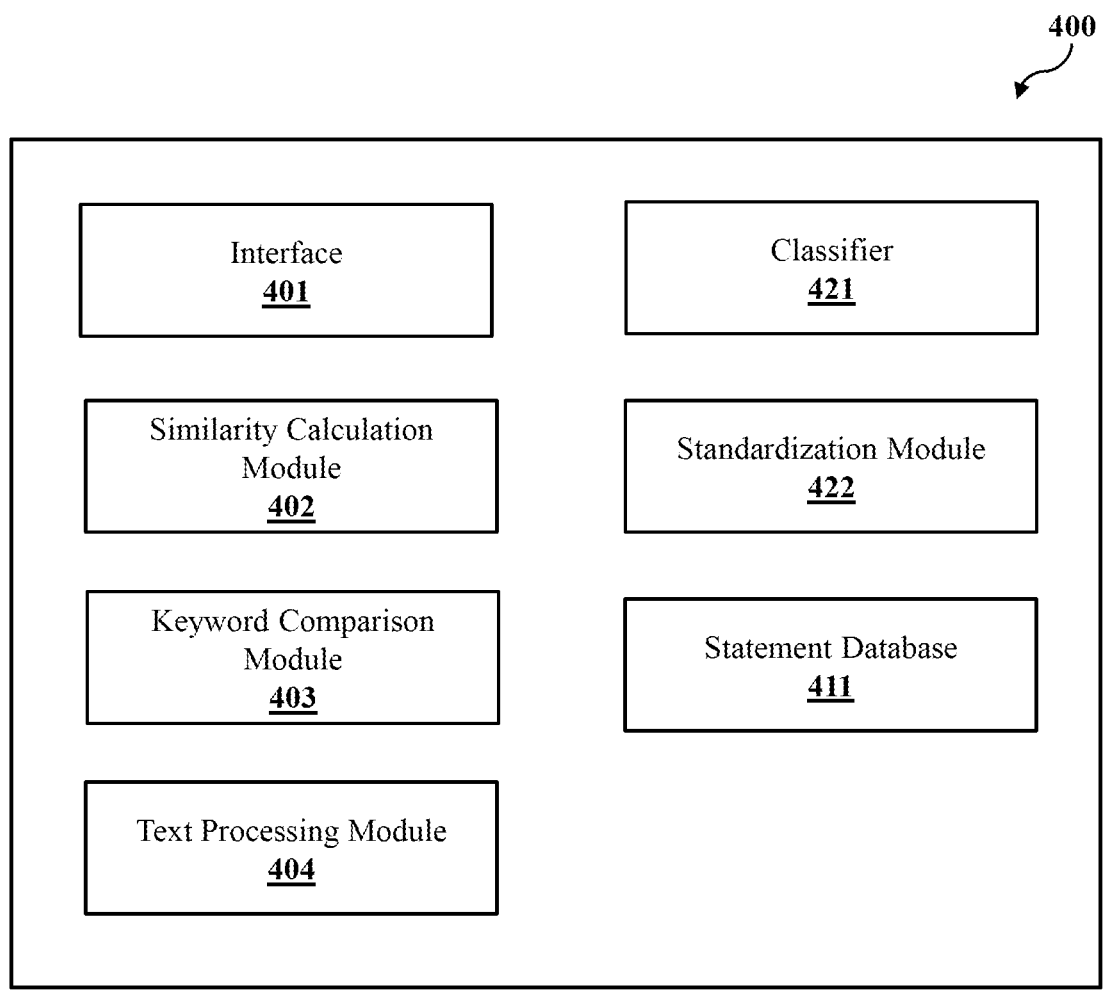
FIG. 4 depicts a schematic diagram of an example text processing system according to embodiments of the present invention.

Referring now to FIG. 4, an example text processing system 400 is depicted according to embodiments of the present invention. The text processing system 400 may be any type of device (including physical or virtual devices) that may be used to process texts. As an example, the text processing system 400 may be the computer system/server 12 of FIG. 1. The text processing system 400 may comprise multiple modules that may locate in a same physical device or different physical devices of the text processing system 400. As a further example, some modules of the text processing system 400 may locate in a physical device outside of (but accessible by) the text processing system 400.

According to embodiments of the present invention, an interface 401 of the text processing system 400 may obtain an original text input from a user in a collaborative development environment or text files stored in the collaborative development environment. As an example, the user may use an input device to provide original text inputs to the interface 401. As a further example, the interface 401 may obtain original text inputs through reading text files stored in the collaborative development environment. A first text statement may be extracted or transformed from the original text inputs. The first text statement includes sentences, phrases and words extracted from the original text inputs. Examples of the first text statements may include "The password is weak, please input a secure one", etc.

In some embodiments, the text processing system 400 may further comprise a classifier 421. The classifier 421 may classify the first text statement into multiple categories based on multiple dimensions. As an example, the first text statement may be classified based on sentence structures. The categories of the first text statement based on sentence structures may include simple sentence, complex sentence, and words/phrases, etc. As a further example, the first text statement may be classified based on tenses, voices, and/or other grammar features of the text statement. In this example, the categories of the first text statement may include past, present, and future, etc. The categories of the first text statement may also include positive, negative, active, and passive etc. It shall be understood that those skilled in the art may classify the first text statement into other now known or to be developed categories.

In some embodiments, the text processing system 400 may further comprise a standardization module 422. The standardization module 422 may standardize the original text inputs using a standardization algorithm to extract and/or obtain the first text statement. The standardization algorithm includes one or more rules for text standardization. As an example, a rule of the standardization algorithm may define statements with simple sentence as standard statements, etc. If an original text input is not a simple sentence, the standardization module 422 may use the standardization algorithm to transform the original text input into a statement with simple sentences. For example, the original text input may be "There is a model has been removed", the standardization module 422 may transform it to a simple sentence "Model has been removed" as the first text statement. In this example, if an original text input is a simple sentence, the original text input may be directly used as the first text statement without the standardization step implemented by the standardization module 422.

In some embodiments, the standardization algorithm may include machine learning algorithms trained using text inputs of different categories. After the training, the machine learning algorithms are specific to one or more categories of text inputs and have better performances to standardize the original text inputs of the one or more categories. If categories of the obtained original text inputs may be found mapping with a trained standardization algorithm, the trained similarity algorithm may be selected by the standardization module 422.

According to embodiments of the present invention, a similarity calculation module 402 of the text processing system 400 may calculate a similarity value between the first text statement and a second text statement obtained from a statement database 411. The statement database 411 may be comprised in or accessible by the text processing system 400. As an example, one or more statement may be stored in the statement database 411. In some embodiments, the one or more statement stored in the statement database 411 may be standard statements specified by users. Table 1 describes example statements stored in the statement database 411. The similarity calculation module 402 may obtain each stored statement from the statement database 411 as the second text statement for the similarity calculation.

TABLE 1

Example stored statements

| Index | Stored Statement |
|---|---|
| 1 | Click this button to save username and password. |
| 2 | Select a model template from the list provided. |
| 3 | Please enter a valid model name. |
| 4 | Model has been deleted. |
| 5 | File must specify a valid absolute path to the file. |

In some embodiments, the similarity calculation module 402 may calculate the similarity value using a similarity algorithm selected at least based on one or more categories of the first text statement provided by the classifier 421. The similarity algorithm may be selected from machine learning algorithms trained using text statements of different categories. After the training, the machine learning algorithms are specific to one or more categories, and have better performances for text statements of the one or more categories. If the one or more categories of the first text statement provided by the classifier 421 may be found mapping with a specific trained similarity algorithm, the specific trained similarity algorithm may be selected in the calculation of the similarity value.

Figure 5:
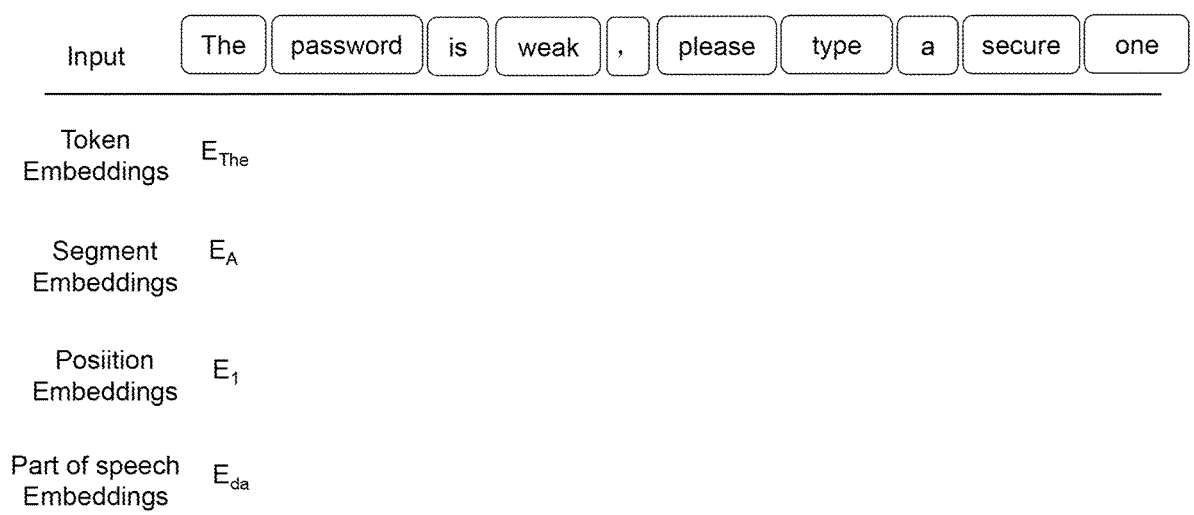
FIG. 5 depicts a schematic diagram of example parameters according to embodiments of the present invention.

In some embodiments, the similarity calculation module 402 may use part of speech (POS) information of words in the first text statement to calculate the similarity value. Typically, the POS information may be determined based on the grammar of the language using natural language processing (NLP) algorithms now known or to be developed. As an example, NLP algorithms may determine POS information of the word "book" in a statement "Please input a book name" as noun, and may determine POS information of the word "book" in a statement "Please book a meeting room" as verb. Referring now to FIG. 5, example parameters used in the similarity calculation are depicted according to embodiments of the present invention. An example input may be a statement "The password is weak, please input a secure one". In this example, besides token embeddings, segment embeddings and position embeddings of words or symbols in the statement obtained by NLP algorithms, POS information (which may also be referred to as POS embeddings) of words in the statement may also be applied by the similarity calculation module 402 in the similarity calculation. Taking the word "The" in the statement as an example, POS information of the word "The" may be determined using NLP algorithms and defined as "$E_{da}$", which represents that the POS information of the word "The" is definite article "da". In the example similarity calculation, since different POS information of different words have different meanings, taking POS information into consideration may make the similarity calculation more reasonable and accurate. By this manner, many existing NLP algorithms may be optimized by taking the POS information of words into consideration.

According to embodiments of the present invention, if the calculated similarity value is greater than a pre-set threshold, a keyword comparison module 403 of the text processing system 400 may compare one or more keywords of the first text statement with one or more keywords of the second text statement. As an example, the calculated similarity value may be in a range from 0 to 1, and the pre-set threshold may be set as 90% by users. It shall be understood, considering the selected similarity algorithm and required accuracy, those skilled in the art may set the pre-set threshold as any appropriate value.

According to embodiments of the present invention, if the keyword comparison module 403 classifying the one or more keywords of the first text statement as mapping with the one or more keywords of the second text statement during the keyword comparison, the text processing system 400 may classify the first text statement as redundant to the second text statement.

In some embodiments, the number of keywords selected from the first text statement (referred to as a first number hereafter) and the number of keywords selected from the second text statement (referred to as a second number hereafter) for the keyword comparison may be pre-set by users. The users may set the first number and the second number as any appropriate number. The first number of keywords and the second number of keywords may be obtained by the keyword comparison module 403 respectively from the first text statement and the second text statement using NLP tools.

In some embodiments, if a first keyword of the first text statement is the same with or has similar meanings with a second keyword of the second text statement, the keyword comparison module 403 may classify the first keyword of the first text statement as mapping with the second keyword of the second text statement.

In some embodiments, the one or more keywords of the first text statement map with the one or more keywords of the second text statement may represent a condition that at least one of the one or more keywords of the first text statement maps with one of the one or more keywords of the second text statement respectively. Correspondingly, the one or more keywords of the first text statement do not map with the one or more keywords of the second text statement may represent the above condition is not satisfied.

In some further embodiments, the one or more keywords of the first text statement map with the one or more keywords of the second text statement may represent a condition that each of the one or more keywords of the first text statement maps with one of the one or more keywords of the second text statement respectively. Correspondingly, the one or more keywords of the first text statement do not map with the one or more keywords of the second text statement may represent the above condition is not satisfied.

In some further embodiments, the one or more keywords of the first text statement map with the one or more keywords of the second text statement may represent a condition that each of a pre-set number of keywords or a pre-set ratio of keywords from the one or more keywords of the first text statement maps with one of the one or more keywords of the second text statement respectively. Correspondingly, the one or more keywords of the first text statement do not map with the one or more keywords of the second text statement may represent the above condition is not satisfied.

In an example, the first number and the second number may both be pre-set by the users as two, which mean the keyword comparison module 403 may compare two keywords obtained from the first text statement with two keywords obtained from the second text statement. If the keyword comparison module 403 classifies the two keywords obtained from the first text statement respectively as mapping with the two keywords obtained from the second text statement, the text processing system 400 may classify the first text statement as redundant to the second text statement. Otherwise, the text processing system 400 may classify the first text statement as not redundant to the second text statement.

In another example, the first text statement may be "Model has been removed", and the second text statement may be "Model has been deleted", and a calculated similarity value between the first text statement and the second text statement may be determined as greater than the pre-set threshold. The first number and the second number may both be pre-set as 1. The keyword comparison module 403 may obtain a keyword "removed" from the first text statement "Model has been removed" and a keyword "deleted" from the second text statement "Model has been deleted". As the keyword "removed" has a meaning similar to the keyword "deleted", the keyword comparison module 403 may classify the keyword "removed" as mapping with keyword "deleted", and then the text processing system 400 may classify the first text statement as redundant to the second text statement.

In some embodiments, the text processing system 400 may further comprise a text processing module 404. If the text processing system 400 classifies the first text statement as redundant to the second text statement, the text processing module 404 may apply the second text statement in a relevant file to replace the first text statement. For example, the first text statement to be analyzed may be "Please enter a good user id and password." The text processing system 400 may determine the first text statement "Please enter a good user id and password." as a non-standard statement relevant to the second text statement "Please enter a valid user id and password." stored in the statement database 411. The text processing module 404 may replace the first text statement "Please enter a good user id and password." with the second text statement "Please enter a valid user id and password." in any or all relevant text files to remove redundancy or non-standardization in the collaborative development environment.

In some embodiments, if the calculated similarity value is less than or equal to than a similarity threshold or the one or more keywords of the first text statement do not map with the one or more keywords of the second text statement, the text processing module 404 may store the first text statement in the statement database 411 for future text processing.

In some further embodiments, the text processing module 404 may send a notification message to the user through the user interface 401. Then the text processing module 404 may receive a user-specified statement corresponding to the first text statement from the user through the interface 401. The text processing module 404 may store the user-specified statement instead of the first text statement in the statement database 411.

Figure 6:
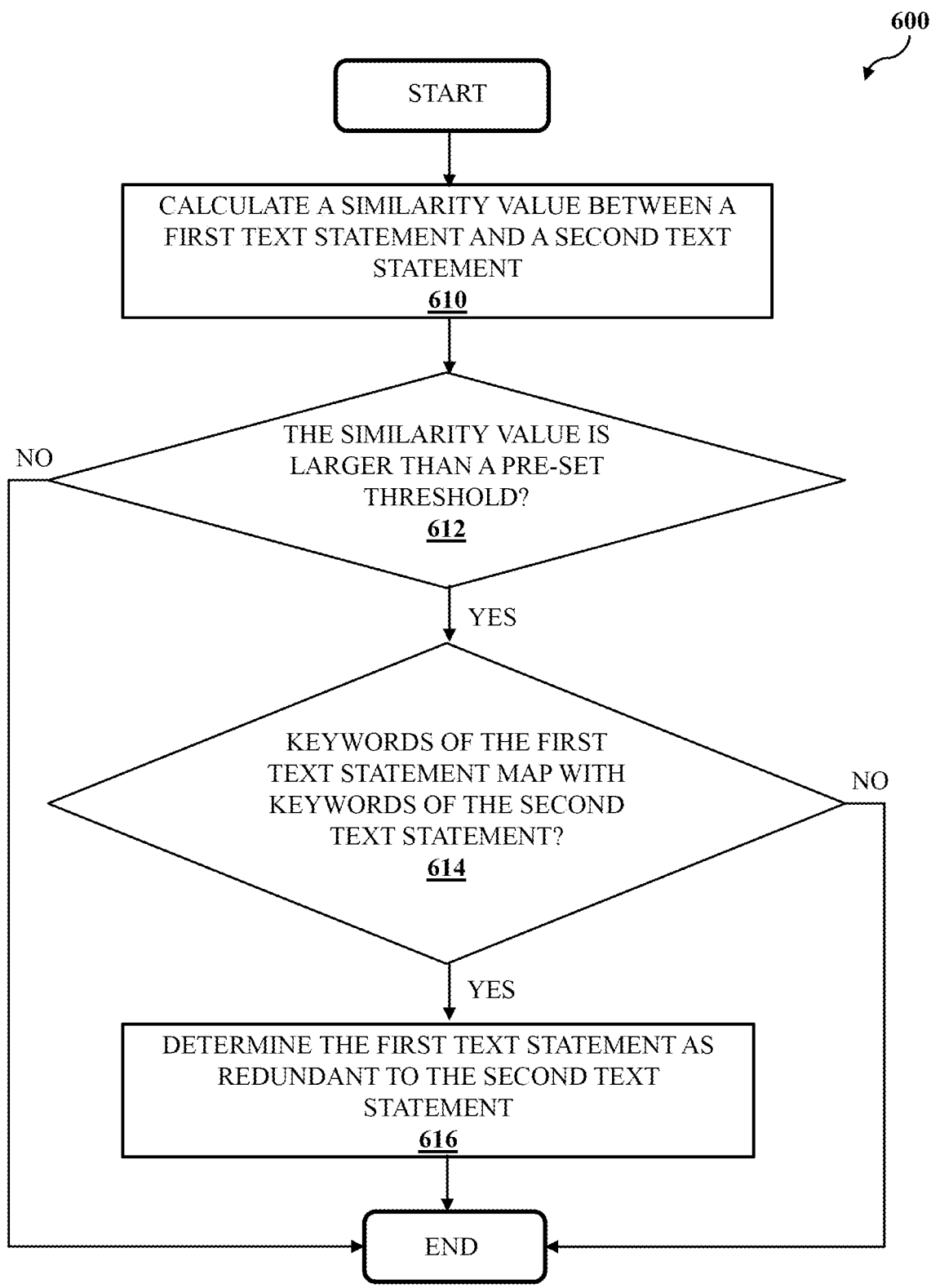
FIG. 6 depicts a flow chart of an example method for text processing according to embodiments of the present invention.

FIG. 6 shows another schematic flowchart of a method 600 for text processing according to an embodiment of the present disclosure. The method 600 may be implemented by the computer system/server 12 of FIG. 1, or a device in a local or network environment. The method 600 may also be implemented by the text processing system 400 of FIG. 4. It should be noted that the method 600 is only illustrative and is not intended to suggest any limitation as to the scope of use or functionality of embodiments of the present invention.

At block 610, a similarity value between a first text statement obtained from text inputs and a second text statement obtained from a statement database may be calculated. Then, at block 612, if the calculated similarity value is larger than a pre-set threshold, the method 600 moves to block 614. At block 614, if keywords of the first text statement map with keywords of the second text statement, the method 600 moves to block 616. At block 616, the first text statement may be determined as redundant to the second text statement.

In some embodiment, if the calculated similarity value is less than or equal to than the pre-set threshold or the keywords of the first text statement do not map with the keywords of the second text statement, the first text statement may be stored in the statement database.

In some embodiment, a notification message may be sent to a user, and then a user-specified statement corresponding to the first text statement may be received from the user. The user-specified statement may be stored in the statement database instead of the first text statement.

In some embodiment, the calculation of the similarity value is implemented using a similarity algorithm selected at least based on one or more categories of the first text statement.

In some embodiment, the similarity algorithm is selected from machine learning algorithms trained using text statements of each of the one or more categories.

In some embodiment, part-of-speech information of words in the first text statement is applied in the calculation of the similarity value.

In some embodiment, the first text statement includes sentences, phrases and words extracted from an original text input received from a user.

In some embodiment, the first text statement is standardized from the original text input using a standardization algorithm selected at least based on categories of the original text input.

In some embodiment, the second text statement may be applied instead of the first text statement.

It should be noted that the processing of text processing according to embodiments of the present invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for text processing, comprising:
   obtaining an original text input in a user interface from a user of a collaborative development environment;
   extracting a first text statement from the original text input, wherein the first text statement is classified into one or more categories according to one or more dimensions;
   selecting a similarity algorithm from a plurality of machine learning algorithms based on the one or more categories of the first text statement, wherein the similarity algorithm selected is trained using text statements of each of the one or more categories of the first text statement;
   calculating a similarity value between the first text statement and a second text statement using the similarity algorithm, wherein the second text statement is obtained from a statement database;
   comparing the similarity value between the first text statement and the second text statement to a pre-set threshold, wherein the pre-set threshold is determined by the user based on the similarity algorithm selected and a required accuracy;
   storing the first text statement in the statement database when the similarity value is less than or equal to the pre-set threshold;
   in response to determining the similarity value between the first text statement and the second text statement is greater than the pre-set threshold the computer-implemented method further comprises:
      comparing the first text statement with the second text statement by mapping a number of keywords of the first text statement to a number of keywords of the second text statement, wherein the number of keywords selected from each text statement is set by the user; and
      replacing the first text statement with the second text statement in all relevant text files to remove redundancy and non-standardization in the collaborative development environment.

2. The computer-implemented method of claim 1, wherein the original text input is input to the collaborative development environment by the user, and the first text statement includes at least sentences, phrases, and words extracted from the original text input.

3. The computer-implemented method of claim 1, wherein the first text statement is extracted from the original text input using a standardization algorithm, and wherein extracting the first text statement from the original text input further comprises:
   standardizing the original text input using the standardization algorithm by transforming the original text input into a statement with simple sentences using the standardization algorithm according to one or more rules for text standardization, wherein the standardization algorithm used is based on one or more categories of the original text input.

4. The computer-implemented method of claim 1, further comprising:
   determining, based on a grammar of a language of the first text statement and the second text statement, the one or more keywords for each text statement using one or more natural language processing algorithms;
   classifying the first text statement as redundant with respect to the second text statement based on the mapping of the number of keywords of the first text statement with the number of keywords of the second text statement during the keyword comparison.

5. The computer-implemented method of claim 1, further comprising:
   determining the similarity value between the first text statement and the second text statement is less than or equal to the pre-set threshold set by the user;
   determining a number of keywords selected from the first text statement and a number of keywords selected from the second text statement do not map, wherein the number of keywords selected from each text statement is determined by the user; and
   storing the first text statement in the statement database for future text processing.

6. The computer-implemented method of claim 5, wherein storing the first text statement in the statement database further comprises:
   sending a notification message to the user of the collaborative development environment through the user interface;
   receiving a user-specified statement corresponding to the first text statement from the user through the user interface; and
   replacing the first text statement with the user-specified statement in the statement database.

7. The computer-implemented method of claim 1, wherein calculating the similarity value further comprises:

applying part-of-speech information, token embeddings, segment embeddings, and position embeddings of words or symbols in the first text statement to the similarity value, wherein the part-of-speech information is determined based on at least grammar of a language using one or more natural language processing algorithms.

8. The computer-implemented method of claim 1, wherein the similarity algorithm is selected from the plurality of machine learning algorithms by a standardization module based on the one or more categories of the first text statement which may be found mapping with the similarity algorithm.

9. The computer-implemented method of claim 1, wherein selecting the similarity algorithm from the plurality of machine learning algorithms further comprises:
   selecting a unique similarity algorithm from the plurality of machine learning algorithms for each of the one or more categories of the first text statement, and wherein calculating the similarity value between the first text statement and the second text statement is based on an output of at least two unique similarity algorithms and a part-of-speech embeddings derived from the first text segment using one or more natural language processing tools.

10. A computer system for text processing, comprising:
    one or more processors;
    a computer-readable memory coupled to the processors, the computer-readable memory comprising instructions that when executed by processors perform actions of:
    obtaining an original text input in a user interface from a user of a collaborative development environment;
    extracting a first text statement from the original text input, wherein the first text statement is classified into one or more categories according to one or more dimensions;
    selecting a similarity algorithm from a plurality of machine learning algorithms based on the one or more categories of the first text statement, wherein the similarity algorithm selected is trained using text statements of each of the one or more categories of the first text statement;
    calculating a similarity value between the first text statement and a second text statement using the similarity algorithm, wherein the second text statement is obtained from a statement database;
    comparing the similarity value between the first text statement and the second text statement to a pre-set threshold, wherein the pre-set threshold is determined by the user based on the similarity algorithm selected and a required accuracy;
    storing the first text statement in the statement database when the similarity value is less than or equal to the pre-set threshold;
    in response to determining the similarity value between the first text statement and the second text statement is greater than the pre-set threshold the computer-implemented method further comprises:
        comparing the first text statement with the second text statement by mapping a number of keywords of the first text statement to a number of keywords of the second text statement, wherein the number of keywords selected from each text statement is set by the user; and
        replacing the first text statement with the second text statement in all relevant text files to remove redundancy and non-standardization in the collaborative development environment.

11. The computer system of claim 10, wherein the original text input is input to the collaborative development environment by the user, and the first text statement includes at least sentences, phrases, and words extracted from the original text input.

12. The computer system of claim 10, wherein the first text statement is extracted from the original text input using a standardization algorithm, and wherein extracting the first text statement from the original text input further comprises:
    standardizing the original text input using the standardization algorithm by transforming the original text input into a statement with simple sentences using the standardization algorithm according to one or more rules for text standardization, wherein the standardization algorithm used is based on one or more categories of the original text input.

13. The computer system of claim 10, further comprising:
    determining, based on a grammar of a language of the first text statement and the second text statement, the one or more keywords for each text statement using one or more natural language processing algorithms;
    classifying the first text statement as redundant with respect to the second text statement based on the mapping of the number of keywords of the first text statement with the number of keywords of the second text statement during the keyword comparison.

14. The computer system of claim 10, further comprising:
    determining the similarity value between the first text statement and the second text statement is less than or equal to the pre-set threshold set by the user;
    determining a number of keywords selected from the first text statement and a number of keywords selected from the second text statement do not map, wherein the number of keywords selected from each text statement is determined by the user; and
    storing the first text statement in the statement database for future text processing.

15. The computer system of claim 14, wherein storing the first text statement in the statement database further comprises:
    sending a notification message to the user of the collaborative development environment through the user interface;
    receiving a user-specified statement corresponding to the first text statement from the user through the user interface; and
    replacing the first text statement with the user-specified statement in the statement database.

16. A computer program product for text processing, comprising:
    one or more non-transitory computer-readable storage media and program instructions stored on at least one of the one or more tangible storage media, the program instructions executable by a processor to cause the processor to perform a method comprising:
    obtaining an original text input in a user interface from a user of a collaborative development environment;
    extracting a first text statement from the original text input, wherein the first text statement is classified into one or more categories according to one or more dimensions;
    selecting a similarity algorithm from a plurality of machine learning algorithms based on the one or more categories of the first text statement, wherein the similarity algorithm selected is trained using text statements of each of the one or more categories of the first text statement;

calculating a similarity value between the first text statement and a second text statement using the similarity algorithm, wherein the second text statement is obtained from a statement database;

comparing the similarity value between the first text statement and the second text statement to a pre-set threshold, wherein the pre-set threshold is determined by the user based on the similarity algorithm selected and a required accuracy;

storing the first text statement in the statement database when the similarity value is less than or equal to the pre-set threshold;

in response to determining the similarity value between the first text statement and the second text statement is greater than the pre-set threshold the computer-implemented method further comprises:

comparing the first text statement with the second text statement by mapping a number of keywords of the first text statement to a number of keywords of the second text statement, wherein the number of keywords selected from each text statement is set by the user; and replacing the first text statement with the second text statement in all relevant text files to remove redundancy and non-standardization in the collaborative development environment.

17. The computer program product of claim 16, wherein the original text input is input to the collaborative development environment by the user, and the first text statement includes at least sentences, phrases, and words extracted from the original text input.

18. The computer program product of claim 16, wherein the first text statement is extracted from the original text input using a standardization algorithm, and wherein extracting the first text statement from the original text input further comprises:

standardizing the original text input using the standardization algorithm by transforming the original text input into a statement with simple sentences using the standardization algorithm according to one or more rules for text standardization, wherein the standardization algorithm used is based on one or more categories of the original text input.

19. The computer program product of claim 16, further comprising:

determining, based on a grammar of a language of the first text statement and the second text statement, the one or more keywords for each text statement using one or more natural language processing algorithms;

classifying the first text statement as redundant with respect to the second text statement based on the mapping of the number of keywords of the first text statement with the number of keywords of the second text statement during the keyword comparison.

20. The computer program product of claim 16, further comprising:

determining the similarity value between the first text statement and the second text statement is less than or equal to the pre-set threshold set by the user;

determining a number of keywords selected from the first text statement and a number of keywords selected from the second text statement do not map, wherein the number of keywords selected from each text statement is determined by the user;

storing the first text statement in the statement database for future text processing;

sending a notification message to the user of the collaborative development environment through the user interface;

receiving a user-specified statement corresponding to the first text statement from the user through the user interface; and replacing the first text statement with the user-specified statement in the statement database.

* * * * *